United States Patent
Haede et al.

[11] 3,910,882
[45] Oct. 7, 1975

[54] CARDIOACTIVE ANHYDROTALOMETHYLOSIDES AND PROCESS FOR PREPARING THEM

[75] Inventors: Werner Haede, Hofheim, Taunus; Werner Fritsch, Neuenhain, Taunus; Ulrich Stache, Hofheim, Taunus; Ernst Lindner, Frankfurt am Main, all of Germany

[73] Assignee: Hoechst Aktiengesellschaft, Frankfurt am Main, Germany

[22] Filed: July 26, 1973

[21] Appl. No.: 382,662

[30] Foreign Application Priority Data
July 28, 1972 Germany............................ 2237144

[52] U.S. Cl............................ 260/210.5; 424/182
[51] Int. Cl.²............................................. C07J 19/00
[58] Field of Search................................ 260/210.5

[56] References Cited
UNITED STATES PATENTS

| | | | |
|---|---|---|---|
| 3,458,628 | 7/1969 | Kaiser et al. | 260/210.5 |
| 3,514,441 | 5/1970 | Satoh et al. | 260/210.5 |
| 3,740,390 | 6/1973 | Heider et al. | 260/210.5 |

OTHER PUBLICATIONS

Fieser and Fieser, Reagents for Org. Synthesis, page 1181, Wiley and Sons, Inc. New York, 1967.

Weissberger, A. Heterocyclic Cpds, Part 1, pp. 147–148, Interscience Publishers, New York, 1964.

Primary Examiner—Johnnie R. Brown
Assistant Examiner—Cary B. Owens
Attorney, Agent, or Firm—Curtis, Morris & Safford

[57] ABSTRACT

The invention relates to 3′, 4′-anhydro-$\beta$, L-talomethylosides of the general formula I

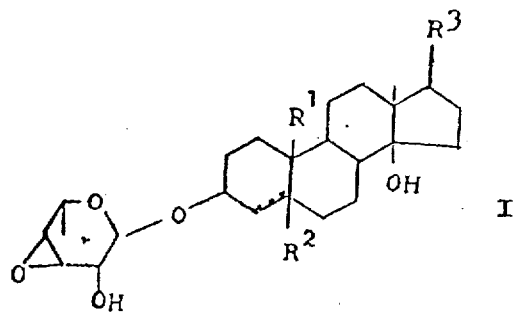

wherein $R^1$ is methyl or formyl and $R^2$ stands for $\beta$—H or $\beta$—OH, if there is no double bond in 4,5-position, and $R^3$ is a butenolide or cumalin ring, a process for preparing them and their use in the treatment of cardiac and circulatory disturbances. The compounds are especially suitable for treating cardiac insufficiency, tachycardia and conduction defects.

4 Claims, No Drawings

CARDIOACTIVE ANHYDROTALOMETHYLOSIDES AND PROCESS FOR PREPARING THEM

The present invention relates to 3′, 4′-anhydro-α, L-talomethylosides of the general formula I

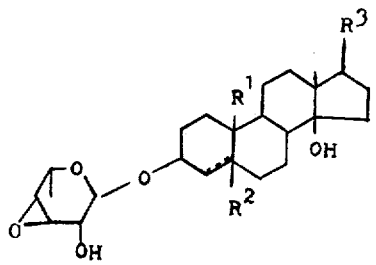

wherein R$^1$ represents methyl or formyl and R$^2$ stands for B—H or β—OH if there is no double bond in 4,5-position, and R$^3$ is a butenolide or cumalin ring.

The invention further relates to a process for preparing these compounds, which comprises reacting acetals or ketals of the general formula II

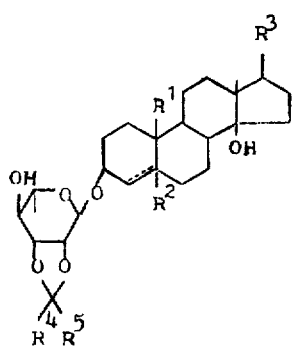

wherein R$^4$ is lower alkyl or phenyl and R$^5$ is hydrogen or lower alkyl, with thionyl or sulfonic acid halides in the presence of bases, subsequently subjecting the compounds obtained of the formula III

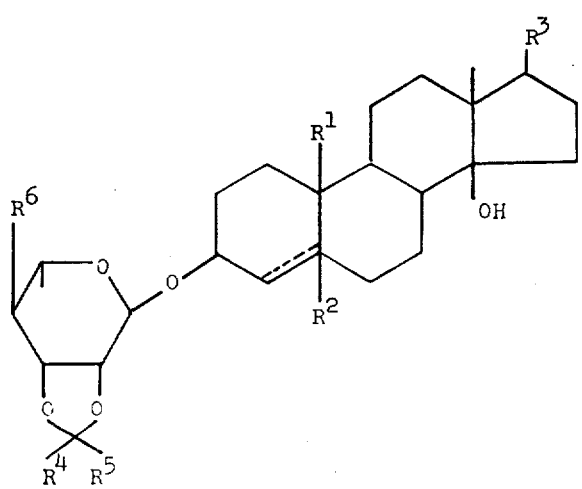

wherein R$^6$ is chlorine, bromine, iodine or the radical —O—SO$_2$R, R being lower alkyl or aryl, to acidic hydrolysis until, on testing, the reaction product no longer contains an alkylidene or benzylidene radical, and treating the compounds thus obtained of the formula IV

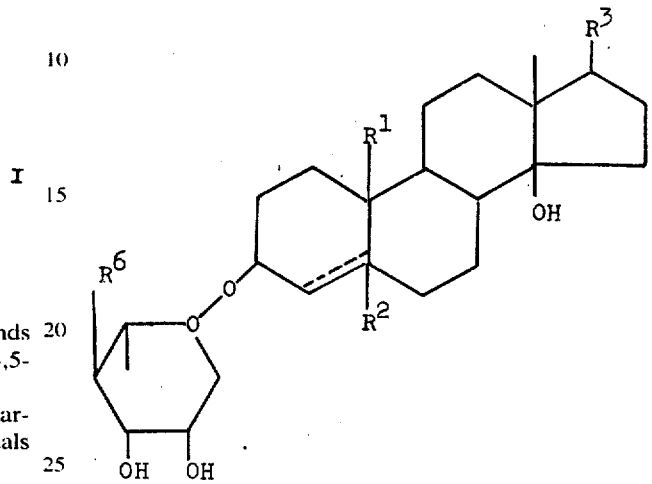

wherein R$^1$, R$^2$, R$^3$ and R$^6$ are as defined above, with hydrogen halide or agents splitting off sulfonic acid.

In the afore-mentioned definitions, lower alkyl is preferably alkyl having from one to four carbon atoms, while aryl is preferably phenyl, tolyl, bromophenyl or benzyl.

Starting materials are 2′, 3′-acetals or 2′, 3′-ketals of the cardioactive steroid rhamnosides of the formula II such as isopropylidene evomonoside, benzylidene convallatoxin, isopropylidene bufalin rhamnoside, isopropylidene proscillaridin A. These acetals or ketals are prepared in known manner, by reacting for example evomonoside (= digitoxigenin-α, L-rhamnopyranoside) with acetone or benzaldehyde in the presence of mineral acids or sulfonic acids. The acetals or ketals of the formula II are esterified in 4′-position with organic sulfonic acids. Esterification is effected by reaction with sulfonic acid halides, as for example the halides of the methane-sulfonic acid or p-toluene-sulfonic acid in the presence of tertiary bases such as triethyl amine or pyridine. The reaction may also be carried out according to Schotten-Baumann by operating in an aqueous suspension and using instead of the tertiary organic bases diluted alkali lyes or other organic bases such as alkali carbonates or bicarbonates, alkaline earth carbonates or alkaline earth hydroxides. Instead of the sulfonic acid halides, thionyl halides in the presence of tertiary amines may also be used to convert the acetals or ketals into the corresponding 4′-halides.

The elimination of the alkylidene or benzylidene radicals serving as protective groups from the 4′-sulfonic acid esters or 4′-halides proceeds only incompletely under the conditions usually applied in the case of isopropylidene rhamnosides (heating with diluted acetic acid) and leads, when heating for some time, to the formation of by-products. However, elimination proceeds in a smooth way when using sulfonic acids or diluted mineral acids in mixtures of inert organic solvents such as tetrahydro-furane or dioxane and water at temperatures of from 20° to 70°C, whereby the upper limit of temperature requires lower acid strengths and the lower limit of temperature requires higher acid strengths or stronger acids, especially mineral acids.

In the beginning a slightly lower temperature is expediently applied. By controlling the course of the reaction by thin layer chromatography it can be determined to which extent the starting material disappears. If desired, the temperature and/or concentration of the acids used may be increased, accordingly.

As eluents for thin layer chromatography on silica gel plates, mixtures of acetic acid ethyl ester and chloroform with an addition of 5 to 20 % of methanol are especially suitable. The alkylidene or benzylidene compounds are characterized by a $R_f$ value considerably higher then that of the hydrolized compound. Particularly suitable is a solution of tetrahydrofurane and water with 5 to 15 % of p-toluene-sulfonic acid at a temperature of from 40° to 60°C and a reaction time of 1 to 4 hours.

Surprisingly, the splitting off of the protective groups, which requires relatively severe conditions due to the presence of the radical $R^6$, can be effected without the glycoside being split to a larger extent, and without water being split off to yield 14-anhydro compounds. In contradiction to this finding, according to Steroids [Fieser and Fieser, Reinhold Publ. Corp., pages 742–743 (1959)]strophandidin derivatives are easily converted into 14-anhydro derivatives under the action of acids.

The formation of the 3', 4'-epoxides of the formula I by splitting off hydrogen halide or sulfonic acid is carried out either with ammonia or organic bases such as primary, secondary of tertiary amines, or with inorganic bases such as diluted alkali lyes, alkali carbonates, alkali bicarbonates, alkaline earth hydroxides or aluminum oxide or a basic ion exchanger. The operation is carried out in organic solvents such as lower aliphatic alcohols or cyclic ethers such as tetrahydrofurane or dioxane at a temperature of from 0° to 25°C. The compounds of the formula II may also be dissolved in solvents such as chloroform or methylene chloride and absorbed on $Al_2O_3$; after 20 to 60 hours the epoxide formed of the formula I is eluted.

According to the process of the invention there can be prepared, for example,

Digitoxigenin-α, L-talomethyloside,
Strophanthidin-α, L-talomethyloside,
Bufalin-α, L-talomethyloside, and
Scillarenin-α, L-talomethyloside.

The anhydrotalomethylosides obtained according to the invention have valuable cardiotonic properties. They not only have a strong positive inotropic action superior to that of the starting materials, but they are also distinguished by a good resorption capacity when administrated orally. Thus, with regard to the elimination of potassium and the positive inotropic action as demonstrated in the test according to Langendorff on guinea pigs' hearts, the anhydrotalomethylosides of the digitoxigenin, strophanthidin and scillarenin are two to three times as effective as the corresponding rhamnosides, evomonoside, convallatoxin and proscillaridin A.

Therefore, the products of the invention are suitable for treating heart diseases such as cardiac insufficiency, tachycardia and conduction defects.

For treating cardiac or circulatory disturbances, the novel compounds are generally administered one to three times daily in a dosage of about 50 to 500 micrograms.

The novel compounds are administered per os in the form of tablets, dragees or capsules, which contain as additives a pharmaceutically usual excipient and/or adjuvant, for example lactose, starch, finely dispersed silicic acid, talcum or calcium carbonate. The compounds according to the invention can also be administered by injection.

Aqueous isotonic salt solutions can be used for intravenous injection, if desired with the addition of a buffer substance and/or a solubilizer.

The following Examples illustrate the invention.

EXAMPLE 1

*a.* Evomonoside-2', 3'-acetonide 6 g of evomonoside were dissolved in 60 ml of THF( = tetrahydrofurane) and stirred with 300 mg of p-toluene-sulfonic acid for 2 hours at room temperature. 0.3 ml of pyridine was added and the reaction solution was evaporated until dry in a rotary evaporator. The residue was dissolved again in acetone and the acetonide was precipitated with water, filtered and dried. The crude product was dissolved in a small amount of methylene chloride and crystallized by addition of ether, Yield: 5.5 g; melting point: 175° – 180°C.

*b.* Evomonoside-2', 3'-acetonide-4'-tosylate 4 g of evomonosidacetonide were dissolved in 16 ml of pyridine in 4 ml of acetone and mixed at 0°C with 6 g of p-toluene-sulfochloride portionwise while stirring. The solution was allowed to stand for 6 days at room temperature and then stirred with 200 ml of ice-water. During this operation the tosylate separated in a greasy state on the edge of the flask. The aqueous layer was decanted and the residue was triturated with water; a crystal slurry was obtained which was suction-filtered and dried. Yield: 4.65 g (crude product).

*c.* Evomonoside-4'-tosylate

After drying in the dessiccator, 4.65 g of the crude product in 150 ml of THF were mixed dropwise at 50°C in the course of 60 minutes with a solution of 23 g of p-toluene-sulfonic acid in 150 ml of water, and the mixture was stirred for 90 minutes at this temperature. Then 70 ml of a 2N sodium acetate solution were added, the solvent in the reaction mixture was evaporated in a rotary evaporator, the amorphous residue was suctionfiltered and dried in the dessiccator. This crude product was dissolved in a small amount of methylene chloride and crystallized by addition of diisopropyl ether. Yield: 4 g; melting point: 145° – 150°C under decomposition.

*d.* Digitoxigenin-3', 4'-anhydro-α, L-talomethyloside:

4 g of evomonoside-4'-tosylate were absorbed on 60 g of $Al_2O_3$ (neutral, activation step II) in 40 ml of methylene chloride and eluated after 40 hours with methylene chloride. The eluate was evaporated and the residue (2.2 g) was chromatographed on 44 g of silica gel. With methylene chloride containing 0.1 % of methanol, 1.7 g of anhydrotalomethyloside were obtained which crystallized from ether. Melting point: 195°– 198°C. After recrystallization from acetic acid ethyl ester, the melting point was 201°–203°C (uncorrected). $[\alpha]_D^{23} = -35.5°$ (methanol 1 %)

EXAMPLE 2

*a.* Convallatoxin-2', 3'-actonide 8 g of convallatoxin were dissolved in a mixture of 80 ml of THF and 80 ml of acetone. After addition of 8 ml of acetone-dimethyl-acetal and 400 mg of p-toluenesulfonic acid, the mixture was stirred for 2 hours at room temperature. After working up as described in Example 1 (a), 6.55 g of the acetonide were obtained having a melting point of 160° – 165°C.

b. Convallatoxin-2', 3'-acetonide-4'-tosylate 4 g of convallatoxinacetonide in a mixture of 16 ml of pyridine and 4 ml of acetone were stirred with 6 g of p-toluene-sulfo-chloride for 60 hours at room temperature. For working up, the mixture was mixed with water. After cooling, the tosylate was precipitated by further addition of water and recrystallized with a small amount of methanol. Yield: 3.5 g; melting point: 200°C (under decomposition).

c. Convallatoxin-4'-tosylate 3.5 g of Convallatoxin-acetonide-tosylate in 105 ml of THF at 50°C were mixed while stirring, in the course of 30 minutes, with a solution of 10.5 g of p-toluenesulfonic acid in 70 ml of water and stirred for 4 hours at this temperature. After cooling, the pH value of the mixture was adjusted to 3.5 – 4 with a 2N sodium acetate solution and the solvent was evaporated to about 100 ml in rotary evaporator. The residue precipitated was separated by filtration, dried, triturated with isopropyl ether and separated again. Yield: 3.05 g; melting point: 160° – 165°C.

d. Strophanthidin-3', 4'-anhydro-α, L-talomethyloside 3 g of convallatoxin-tosylate were absorbed in 30 ml of methylene chloride on 40 g of $Al_2O_3$ (neutral, activation step II) and eluted for 60 hours with methylene chloride which contained 0.5 % of methanol. After elution the residue was crystallized from methanol. Yield: 1.65 g; two melting points: 143° – 147° and 238° – 240°C; $[\alpha]_D^{23} = - 10.7°$ (methanol 1 %).

EXAMPLE 3

Scillarenin-3', 4'-anhydro-α, L-talomethyloside

In analogous way as described in the Examples 1 and 2, scillarenin-3', 4'-anhydro-α, L-talomethyloside was obtained by way of the 4'-tosylate (melting point: 123°C under decomposition) starting from proscillaridin A. Yield: 40 mg (from 200 mg); melting point 215° – 218°C; $[\alpha]_D^{25} = - 66.6°$ (methanol 0.5 %).

What is claimed is:

1. A 3', 4'-anhydro-α-L-talomethyloside of the formula I

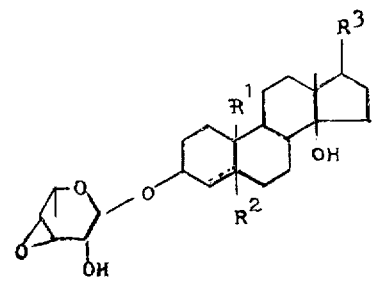

I wherein $R^1$ is methyl or formyl, $R^2$ stands for β—H or β—OH, if there is no double bond in 4,5-position, and $R^3$ is a butenolide or cumalin ring.

2. A compound as claimed in claim 1, which is digitoxigenin-3', 4'-anhydro-α, L-talomethyloside.

3. A compound as claimed in claim 1, which is strophanthidin-3', 4'-anhydro-α, L-talomethyloside.

4. A compound as claimed in claim 1, which is scillarenin-3', 4'-anhydro-α, L-talomethyloside.

* * * * *